United States Patent [19]

Hart

[11] Patent Number: 5,038,580
[45] Date of Patent: Aug. 13, 1991

[54] HEAT PUMP SYSTEM

[76] Inventor: David P. Hart, 9084 Olentangy River Rd., Delaware, Ohio 43015

[21] Appl. No.: 446,487

[22] Filed: Dec. 5, 1989

[51] Int. Cl.⁵ .............................................. F25B 13/00
[52] U.S. Cl. ...................................... 62/324.6; 62/260
[58] Field of Search ................ 62/324.6, 238.6, 238.7, 62/260; 165/45; 237/2 B

[56] References Cited

U.S. PATENT DOCUMENTS

| | | | |
|---|---|---|---|
| 2,503,456 | 4/1950 | Smith | 62/115 |
| 3,167,930 | 2/1965 | Block et al. | 62/324.6 X |
| 4,255,936 | 3/1981 | Cochran | 62/238.7 |
| 4,375,831 | 3/1983 | Downing, Jr. | 62/260 X |
| 4,383,419 | 5/1983 | Bottum | 62/238.6 |
| 4,570,452 | 2/1986 | Bingham | 62/260 |
| 4,573,327 | 3/1986 | Cochran | 62/238 |
| 4,584,844 | 4/1986 | Lemal | 62/160 |
| 4,665,716 | 5/1987 | Cochran | 62/503 |
| 4,688,717 | 8/1987 | Jungwirth | 237/2 B |
| 4,715,429 | 12/1988 | Morgensen | 165/45 |
| 4,741,388 | 5/1988 | Kuroiwa | 165/45 |
| 4,753,285 | 6/1988 | Rawlings | 165/45 |
| 4,903,495 | 2/1990 | Howland et al. | 62/324.6 X |
| 4,920,757 | 5/1990 | Gazes et al. | 62/260 X |

Primary Examiner—Lloyd L. King

[57] ABSTRACT

The present invention is a heat pump system having a direct earth coupled underground heat exchanging apparatus. The system uses a heat exchanging fluid existing in both gaseous and liquid form during operation and includes ancillary equipment and associated controls for carrying out various functions such as cooling, heating, refrigeration and water heating. By effectively utilizing the excellent heat conservation characteristics and huge heat capacity of subsurface earth or water, a greatly improved level of efficiency is achieved. The apparatus comprises a compressor 1, an expansion valve 8, a receiver 7, an indoor evaporator/condenser coil 5, a four way reversing valve 3, an accumulator 16 and a plurality of evaporator/condenser coils 11 disposed in the earth. The apparatus uses the native earth as a heat source in the heating mode and as heat sink in the cooling mode.

21 Claims, 3 Drawing Sheets

HEAT PUMP SYSTEM

FIELD OF THE INVENTION

The present invention relates to heat pumps and more specifically to heat pumps having direct earth coupled heat exchangers.

BACKGROUND OF THE INVENTION

A direct earth coupled heat pump is one that has its refrigerant evaporator/condenser in direct thermal contact with the earth from which heat is either extracted from in the heating mode or is introduced to in the cooling mode of operation. Many attempts have been made in the past to develop successful direct coupled heat pumps for residential and commercial uses. These attempts have failed to adequately meet a number of requirements associated with an economically and functionally viable system. Some of the shortcomings include:

Inadequate oil return to the compressor primarily in the heating mode;

Inadequate evaporator length and spacing for properly extracting heat from the earth resulting in low capacity and low efficiency of the systems;

Lack of a proper means to store additional refrigerant required during the cooling operation, but not needed during the heating mode.

Lack of volume control of the compressor for providing the necessary increase in displacement during the heating operation over that displacement needed for the cooling operation. This lack of displacement control results in insufficient heating capacity during the coldest weather.

SUMMARY OF THE INVENTION

The present invention is a heat pump system having a direct earth coupled underground heat exchanger. The device includes ancillary equipment and associated controls for carrying out various functions such as cooling, heating, refrigeration and water heating. It is an object of the invention to provide a heat pump for satisfying the heating requirements of a building without resort to electric resistance heat during the coldest weather. The peak electrical demand that the electric utility experiences is reduced on the coldest day with a direct earth coupled heat pump and underground heat exchanging apparatus. The electrical demand for a typical house is about 3.6 KW with a direct earth coupled heat pump and underground heat exchanging apparatus while with electric resistance heat the demand is approximately 10.8 KW to heat the same house. A coefficient of performance (COP) of 3 is easily obtained for a heat pump using a direct earth coupled underground heat exchanger. Another object of the invention is to provide a heat pump for installation in various locations with diverse soil types using either vertical or horizontal evaporator/condenser coils in the earth while having the heat pump operate as designed without the skills of highly trained installation mechanics. Still another object of the invention is to provide a heat pump having a COP in the range of 3 to 4 over a wide outside temperature range. Yet another object of the invention is to provide a heat pump for cooling as required, using the earth as a heat sink without experiencing high discharge pressures usually encountered when using the earth as a heat sink.

BRIEF DESCRIPTION OF THE DRAWINGS

The invention together with further objects and advantages thereof may be better seen in reference to the following description taken in conjunction with the accompanying drawings in which.

DETAILED DESCRIPTION OF THE INVENTION

Figure 1:
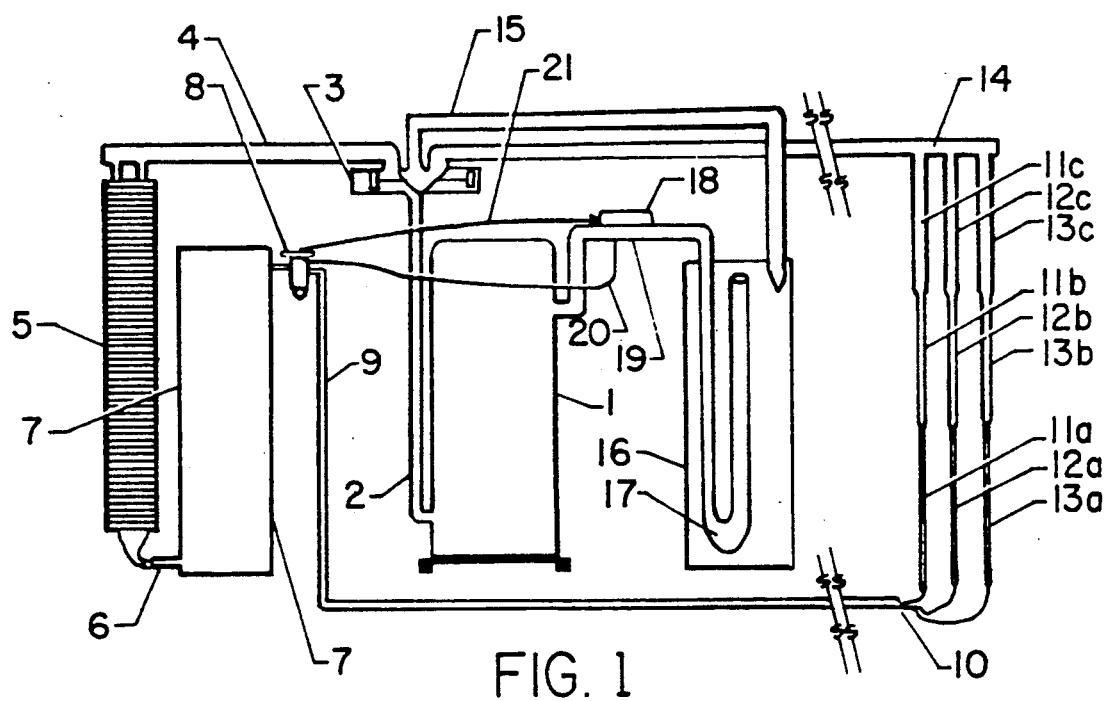
FIG. 1 is a schematic diagram of the apparatus with the four-way valve positioned in the heating mode.

Referring now to FIG. 1, a schematic of the heat pump and heat exchanger, a compressor 1 for compressing refrigerant vapor and discharging it, along with a small quantity of oil, into discharge line 2 leading to a reversing four-way valve 3 depicted in the heating mode position where the refrigerant is directed through line 4 to the indoor coil 5. The hot refrigerant vapor is condensed in the indoor coil 5 releasing its heat to air flowing around it. This heated air may be driven by a blower through ducts in a building to heat a building. The condensed refrigerant liquid is transferred from the bottom of the indoor coil 5 to receiver 7 by way of line 6. Approximately twice the quantity of refrigerant charge is required in the cooling cycle as compared to the heating cycle. The unit must be sized to meet the cooling requirement, but in order to operate properly during the heating season a portion of the refrigerant charge must be stored. This function is accomplished by storing a portion of the refrigerant during the heating cycle. The excess charge not required during heating is stored in the receiver 7. At the top of receiver 7 refrigerant flows to a bi-directional balanced expansion valve 8. The liquid refrigerant entering valve 8 flows through an orifice in the valve which reduces its pressure so that some flash gas as well as liquid flows in line 9 to the distributor 10 where the flow is equally divided among earth coils 11, 12, and 13 by means of distributor tubes.

As the liquid refrigerant and flash gas enters evaporator lines 11a, 12a and 13a most is liquid refrigerant by weight. In the preferred embodiment, as heat is absorbed from the earth most of the liquid is vaporized in tubes 11b, 12b and 13b. In an alternate embodiment, heat may be absorbed from a water pond 73 or other source thereby vaporizing the refrigerant.

The design of the exchanger tubes affects proper pressure control and refrigerant velocity through the tubes. A higher velocity improves heat transfer by minimizing pressure drop and, therefore, temperature drop, and velocity must remain high enough to insure that the oil is returned to the compressor. As the refrigerant expands from liquid to vapor, the exchanger tube diameter is increased to maintain the proper velocities, for optimum pressure drop. In the last section of evaporator lines 11c, 12c and 13c most of the refrigerant is in vapor form and the vapor velocity is maintained sufficiently high for returning oil to the compressor through line 14. Vapor and oil from line 14 enter the reversing valve 3 and are directed to line 15 which is connected to the top of accumulator 16. In accumulator 16 any liquid refrigerant and oil are trapped and prevented from returning directly to the compressor. An orifice disposed at the bottom of the U tube 17 in the accumulator 16 slowly dispenses any oil or liquid refrigerant back to the compressor in a non-slugging manner. The power head of the expansion valve 8 is connected to the sensing bulb 18 by means of a capillary tube 21. Sensing bulb 18 is clamped to suction line 19 for sensing temperature of superheat of the vapor entering the compressor and equalizer line 20 where pressure in suction line 19 is sensed. High superheat (6°–7° F.) opens the valve to keep the optimum amount of refrigerant flowing to the earth coils 11,12 and 13. This completes the cooling cycle.

In the heating mode the first stage of the heating thermostat causes the compressor to operate at low speed, 1750 RPM in the preferred embodiment. When low speed operation does not supply the desired quantity of heat, second stage contacts are closed, the compressor stops and after a predetermined time delay the compressor begins operating at high speed, 3500 RPM thus increasing the capacity of the heat pump. Generally cold weather operation is high speed.

Figure 2:
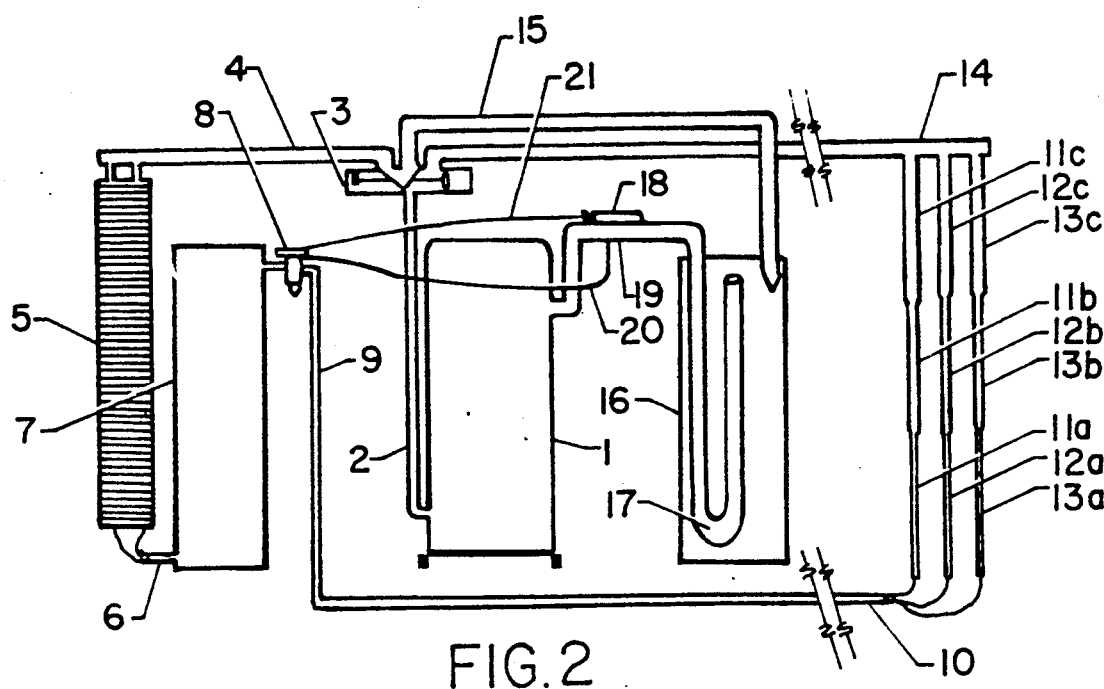
FIG. 2 is a schematic diagram of the apparatus with the four-way valve positioned in the cooling mode.

Referring now to FIG. 2 which depicts the flow of refrigerant during the cooling operation, it is noted that the refrigerant flows in the opposite direction in the heating mode.

The compressor 1 delivers high pressure hot gas through discharge line 2 to reversing four way valve 3 then to line 14 leading to earth coils 11,12 and 13. The refrigerant is in vapor form as it enters the earth coils where it is condensed as it passes the length of the coils. As the percentage of vapor decreases the diameter of the coils is decreased. At the small end of each tube the refrigerant is all liquid as it enters the distributor tubes and distributor 10. The liquid flows through line 9 to expansion valve 8 which is a bi-directional valve with pressure balanced ports. The liquid and flash gas enters receiver 7 where liquid falls to the bottom and exits the receiver 7 through the entrance to line 6 leading to the bottom of indoor coil 5 where it evaporates thus cooling air passing around it. A blower distributes the cooled air through ducts to cool a building. The refrigerant leaves the indoor coil through line 4 to the four-way valve 3 which directs it through line 15 to accumulator 16. Any oil or liquid refrigerant is trapped in the accumulator and is slowly dispensed to the compressor through an orifice located at the bottom of the U tube 17 carrying vapor back to the compressor 1 through line 19. The power head of expansion valve 8 is connected to the sensing bulb 18 by means of capillary tube 21. Sensing bulb 18 senses the temperature of the vapor in suction line 19 and equalizer line 20 senses the pressure in line 19 if superheat is high 6°–7° F. the expansion valve 8 opens further, if the superheat is low 3°–5° F. the valve 8 will further close to restore superheat to a normal 5°–6° F. This completes the cycle. During typical cooling operation the compressor operates at low speed (1750 RPM 4 pole). In exceptional circumstances where high speed cooling is required it can be provided.

The electrical wiring of the preferred embodiment is similar to that of conventional 2 speed heat pump connected to a 3 stage thermostat with the third stage of the heating thermostat being reserved for electric resistance heat or a back up fuel fired furnace. In retrofit cases a heat pump with a heating and cooling feature is added to an existing fuel fired hot air furnace with the furnace being the third stage heat source.

Figure 3:
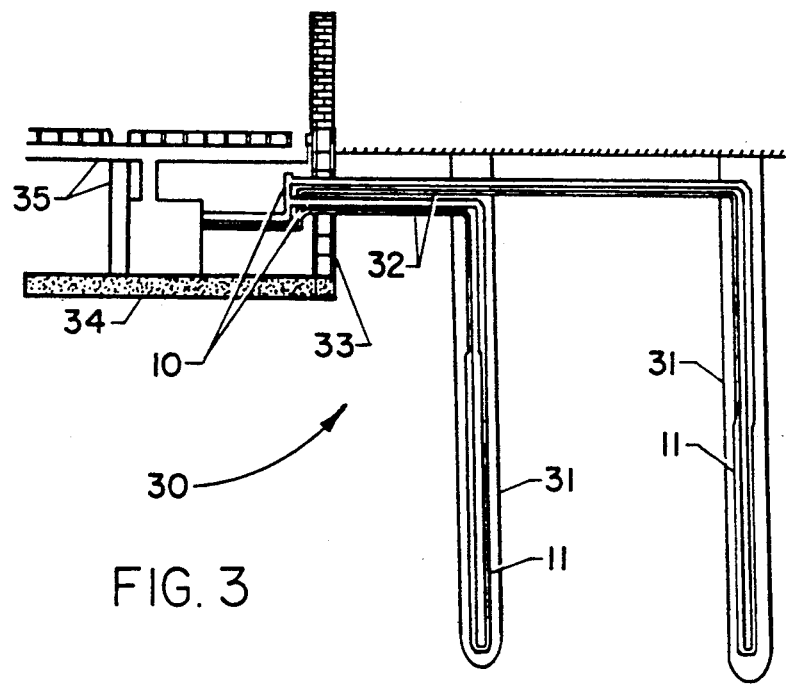
FIG. 3 illustrates the construction of a typical vertical heat exchanger installation.

FIG. 3 illustrates the construction of a typical heat exchanger installation generally depicted by numeral 30. The distribution lines 32 pass through the exterior wall 33 of the house below ground level. The distribution lines 32 connect to the headers 10 which are connected to a Direct Earth Coupled Heat Pump 34 which supplies heated or cooled air for distribution through a duct system 35. The vertical hole 31 is typically 100 feet deep with 3 to 8 holes required depending upon location, soil type, and heating demand. Because most well drilling equipment is not equipped to drill 2.5 inch diameter holes, holes as large as 6.5 inches in diameter may have to be used. The only problem with larger holes is they are more costly to drill and require more grouting material to backfill. If heat exchangers are disposed too close to each other the heating and cooling capacities of the heat exchangers are reduced. A computer program calculates performance with closer spacing resulting in longer lengths for heat exchangers and in additional circuits.

Figure 4:
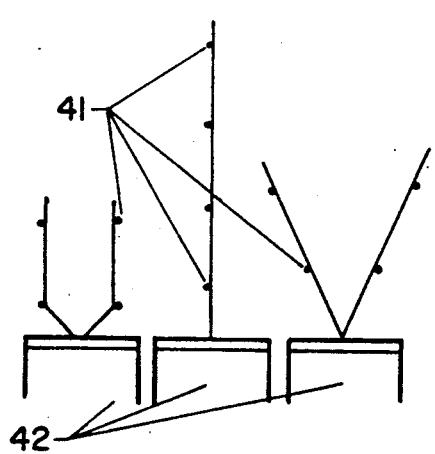
FIG. 4 depicts various patterns of drilled holes for vertical heat exchangers arranged to take maximum advantage of space available around a building.

FIG. 4 illustrates how the arrangement of the drill holes can be adjusted to the space available around a building 41 by using different patterns of drill holes.

Figure 5:
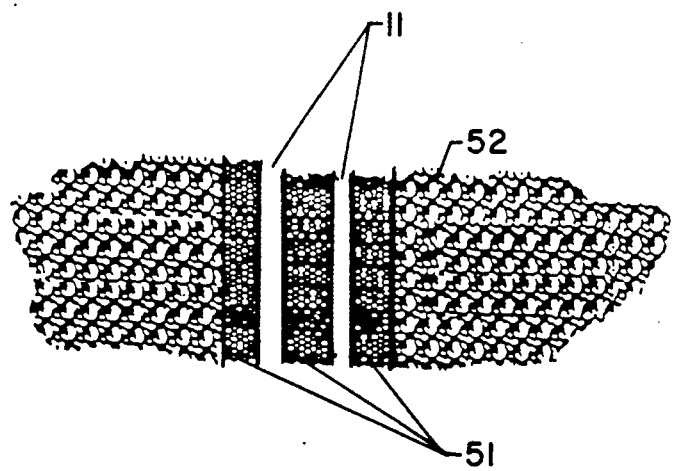
FIG. 5 is a cross sectional view of a typical vertical drilled hole.

FIG. 5 shows a cross section through a typical drill hole. Good grouting 51 with neet cement or a properly mixed slurry of bentonite clay and water are acceptable and comply with codes in most states. The complete grouting improves the heat transfer from the earth coils 11 through the grouting material to the native soil or rock 52. Since most vertical exchangers have a sizable portion of their surface below the water table additional means of keeping the heat exchanger moist during the cooling season is not required.

Figure 6:
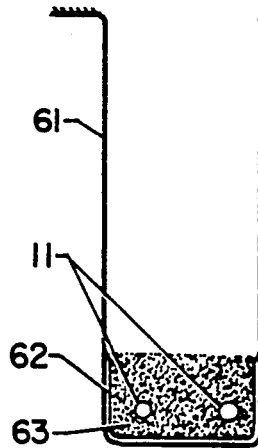
FIG. 6 is a cross sectional view of a typical horizontal heat transfer element installed in a trench in the earth.

FIG. 6 illustrates the installation of a typical horizontal loop. A two foot wide trench 61 is dug about six feet deep by a back hoe or trencher and the length is lined with a polyethylene or similar membrane 62 to aid in water retention. The trench is back filled about two inches with sand 63 then heat exchanger tubes 11 are placed in the trench which is back filled with sand 63 to a depth of 8 to 10 inches total.

Figure 7:
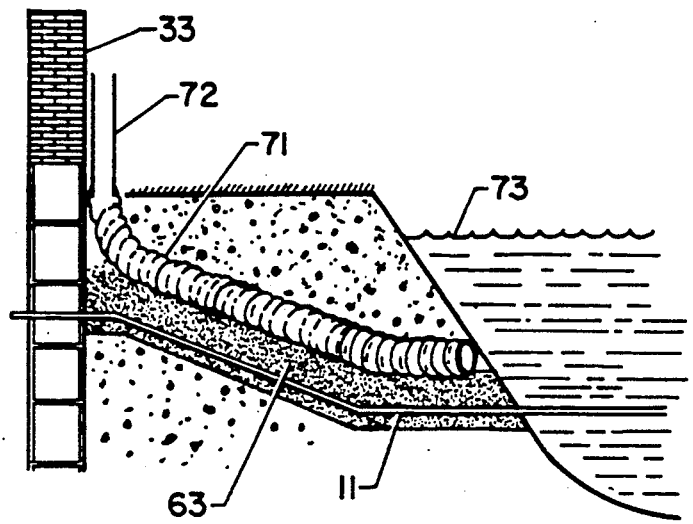
FIG. 7 depicts a typical grade at a building where heat exchangers enter the building with heat exchangers disposed in the ground and in a pond of water.

FIG. 7 illustrates the typical grade at the building wall where the heat exchanger tube rises to enter the house at least one foot above the main trench. A perforated plastic pipe 71 or drain tile is connected to the down spouts 72 of a building so that the rain water saturates the sand used to backfill the heat exchanger trench where the earth coils 11 are disposed. In areas with little warm weather rainfall, the soaking of the sand can also be accomplished using part of the septic system drain field. Water from the building water system can also be used. In case the pressure water system is used, automatic saturation can be arranged by connecting a pressure switch to discharge of the compressor so that when high discharge pressures are experienced the switch will close contacts and open a solenoid water valve to allow water to saturate the sand surrounding the heat exchanger. In saturated sand the heat exchanger heats the water and the soil atmosphere becomes saturated and migrates to colder areas of soil where the moisture condenses. This results in better heat transfer during the cooling season. The installation of heat exchanger elements in a pond of water is also depicted.

Figure 8:
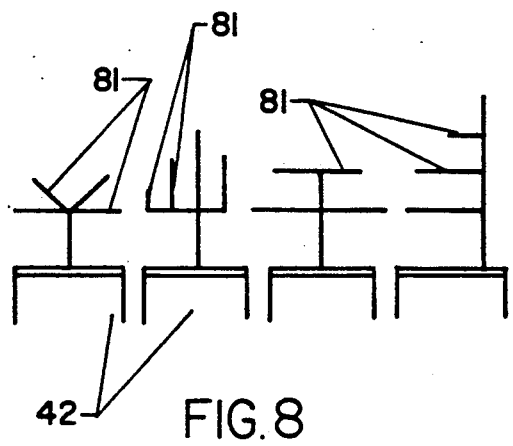
FIG. 8 is a diagram depicting four different configurations of horizontal heat exchanger element loops.
Figure 9:
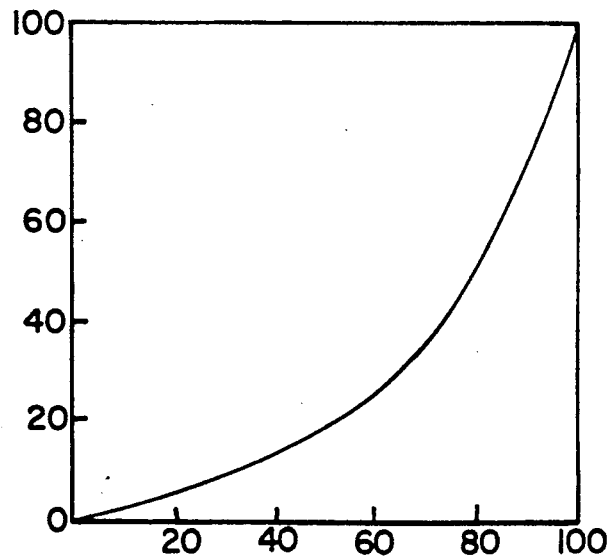
FIG. 9 is a graphic presentation of a curve illustrating the percent of length versus the percent of pressure drop as determined by experiments.

FIG. 8 shows four different configurations of horizontal heat exchanger loops 81. Note that 5 foot intervals can be used in the horizontal loop because they are generally twice as long as vertical loops are deep. During dry period water can be added to the perforated pipe causing saturation of the soil thus lowering head pressure and maintaining performance at an optimum level.

In order to accomplish the above efficiently a special type of tapered evaporator/condenser is employed. The preferred embodiment of the heat transfer coil minimizes the amount of refrigerant circulating in a large coil and provides sufficient vapor velocity when operated as an evaporator to assure oil return to the compressor. In addition the coil has sufficient length to absorb the quantity of heat required to heat a given building. For an average single family residential building this equates to three to six coils each about 450 feet long. The typical coil comprises a soft copper tube one third of which is ⅜ inch OD one third ½ inch OD and one third ⅝ inch OD prefabricated and furnished as one coil. While copper is the preferred material for direct earth coupled heat exchangers. Other materials such as annealed stainless steel or other ductile materials impermeable to refrigerant liquid and vapor that can resist soil corrosion may also be used if the inside diameters are the same as the copper tubing. Coil pressure drops and oil return characteristics are calculated using ASHRAE recommendation as contained in 1984 Systems Handbook chapter 24 on system practices for halocarbon refrigerants. The length and number of coils is determined by the geographic location and soil type. The calculations are made using the 1986 publication of the National Water Well Association titled "Earth Coupled Heat Transfer" by David Hart, President of Powell Energy Products and Rick Couvellion, Phd, University of Arkansas, Fayetteville. The address of the National Water Well Association is 6375 Riverside Drive, Dublin, Ohio 43017.

The configuration and total length of heat exchanger tube in the earth required to heat and to cool a building with the coils can be calculated using an Oklahoma State University Computer Program (CLGS). The input data required for the program are as follows:

a. Building heat loss and gain by ASHRAE methods;
b. Location of building from tables in computer storage;
c. Soil type - by test;
d. Vertical or horizontal configuration of heat exchangers;
e. Pipe selection material and diameter (use diameter of mid portion)
f. Depth and pipe configuration (distance between loops); and
g. Minimum allowable evaporator temperature (heating) and maximum condensing temperature (cooling).

The result of this program will give the total length of heat exchanger tubing required for heating and the length required for cooling with the longer of the two lengths being selected to properly design the system. In the warmer regions the longest length will probably be for cooling while in cooler areas the longer length will probably be for heating.

In a heat pump system the total length of tubing will be allocated among a plurality of individual circuits which may number as high as ten circuits. If more circuits are used than required the refrigerant charge may be too large, causing a reduction in velocity resulting in the possibility that the oil may not be returned to the compressor as it should.

Once the evaporator size and configuration are established the charge for heating and for cooling is determined and the size of the receiver and accumulator can be calculated. Two things of prime importance are the return of oil to the compressor and minimizing of the refrigerant charge.

Oil return is addressed in ASHRAE 1986 Refrigeration Handbooks, Chapter 3. The most severe problem is oil return up vertical suction piping. This would apply to vertical piping in the heating modes at low speed operation at the lowest evaporator temperature. While the model H23A463JPC Bristol two speed compressor was used in all examples of this application, different compressors of a greater or smaller displacement require a new set of calculations. The worst conditions typically encountered are 20° F. evaporating temperature and 110° F. condensing temperatures and low speed operation. At this condition 14,175 BTU/hr of evaporator capacity is available. 197 pounds of liquid R22 is condensed per hour and when vaporized must carry oil up the suction line by virtue of its velocity. Table I shows the diameters of several possible suction lines and the minimum tonnage that each can handle and still return oil.

TABLE I

| Tube O.D. | Minimum tonnage | Maximum # circuits |
|---|---|---|
| ½ | 0.135 | 8.75, use 8 |
| ⅝ | 0.242 | 4.88, use 4 |
| ¾ | 0.399 | 2.96, use 2 |
| ⅞ | 0.603 | 1.96, use 1 |
| 1⅛ | 1.17 | 1.01, use 1 |

The third column is obtained by dividing the compressor capacity of 1.18 tons by the minimum tonnage figures for each tube size.

A refrigerant pressure drop of 10 PSI for R22 is about as high as can be tolerated in a high performance heat pump. At 25° saturated suction temperature this means that the first part of the evaporation is 33° F. In heat pump having direct earth coupled heat exchanger coils the use of one diameter of tubing results in either an excessive amount of charge or an unacceptable pressure drop. To overcome this obstacle, a tapered or three different diameter tube heat exchanger was developed and tested in fourteen residential test buildings in 1989 by Hoosier Energy under a grant from the National Rural Electric Cooperative Association Research Program. The results of these tests using a tapered heat exchanger confirm that the design is sound, that the pressure drop can be restrained within established limits and that the refrigerant charge can be reduced to a manageable size while achieving high performance.

The calculation of the pressure drop in a heat exchanger tube of three different diameters is difficult, and one method will be discussed:

The temperature of the boiling or condensing refrigerant in the earth coil depends on the system low side or high side pressure. Lower pressures result in lower temperatures. In the heating mode, when the earth coil is acting as an evaporator, pressure drop results in warmer temperatures in the inlet portion of the coil and colder temperatures toward the outlet. The varying evaporating temperature results in a decrease in the log mean temperature difference between the coil and the earth, which adversely impacts performance. Somewhat of an offset to the degradation of LMTD is the fact that increased refrigerant velocity increases the refrigerant side heat transfer coefficient and air source evaporators are normally circuited with up to a 7 psi drop (R-22), and still obtain performance about equal to coils circuited for a two to four psi pressure drop. If greater pressure drops are encountered the coil performance is decreased and additional circuits are required to meet the heating and cooling requirements. An insufficient pressure drop indicates that the tube diameters are too large and the charge of refrigerant will be large. If the tube diameters are too small the pressure drop will be too great and coil performance will suffer. A careful calculation will determine the optimum pressure drop without degrading performance. The factors involved include cost of tubing, cost of refrigerant and cost of installation if longer heat exchangers are required. This generally results in 10-11 PSI pressure drop as being optimum. In the future, with greater costs for copper and refrigerant and labor, higher or lower pressure drops may be more cost effective. The demonstration project has shown that three vertical 100 foot heat exchangers, consisting of 80 feet of ⅜ inch OD tube, 100 feet of ½ inch OD tube and 80 feet of ⅝ inch OD tube work well with a 4 ton heat pump, as do four 450 foot horizontal coils consisting of 150 feet each of ⅜ inch OD, ½ inch OD and ⅝ inch OD, and they will be used as the basis for determining maximum allowable pressure drop.

Pressure drop in an evaporator coil is due to friction forces between the tube wall and the moving fluid. It can be shown using the equations revealed in Chapter 2 of ASHRAE Fundamentals Handbook, 1984, that:

$$\Delta P = \frac{3164L}{2g}\left(\frac{M\rho}{\frac{\pi}{4}}\right)^{1.75}(v)^{0.25}\left(\frac{1}{D}\right)^{4.75}$$

This formula alone is not very useful, but if evaporator pressure drops for one diameter of tube have been obtained, the pressure drop of another diameter evaporator having the same mass flow at the same temperature can be calculated by:

$$\frac{\Delta P_1}{\Delta P_2} = \left(\frac{L_1}{L_2}\right)\left(\frac{D_2}{D_1}\right)^{4.75}$$

The nomagraph FEPS 542-3 is based on the above equation and used since 1967 to predict coil pressure drops. Various diameter copper tubes have been added to the inside diameter curves for use with direct earth heat exchangers.

The above equations were originally developed for either liquids or gases. With a phase changing fluid, such as boiling refrigerant, the fluid velocity increases as a greater percentage of the fluid changes phase from a liquid to a gas. The equations are accurate if the entire boiling process is considered, but the pressure drop of an evaporator is not linear as indicated by the equations.

A test where pressure readings are taken at various evaporator lengths could be constructed and the percent of the total pressure drop that has occurred at different percentages of the total evaporator tubing length obtained. Referring now to FIG. 10, from curve C-613, one can predict the pressure drops within tapered heat exchangers. The basis of determining which tapered heat exchangers are acceptable will be the pressure drop calculated for a 3-circuit vertical heat exchanger or the pressure drop calculated for a 4-circuit 450 foot horizontal heat exchanger, whichever is greatest. All heat exchangers are evaluated at high speed compressor operation at 120° F. saturated condensing temperature and 30° F. saturated evaporating temperature. (Mass flow =506.1 lb/hr).

The pressure drops are calculated from FEPS 542-3 as if the entire heat exchanger were the largest diameter (⅝ inch O.D.) and increased per C-613 to account for the smaller tube diameters elsewhere in the heat exchanger. The increase in the smaller sections will be proportional to the diameter raised to the 4.75 power. The ½ inch O.D. section will have 3.013 times the pressure drop in its part of the coil as it would have if it remained ⅝ inch. The ⅜ inch O.D. section of the coil will have 13.88 times the pressure drop in its part of the coil as it would have if it remained ⅝ inch.

| | Heat Exchanger Type | |
|---|---|---|
| | Vertical | Horizontal |
| ⅝ portion % of length | 30.8 | 33.3 |
| ⅝ portion % of ΔP if ⅝ | 8 | 9 |
| ⅝ portion % ΔP tapered | 111.0 | 124.9 |
| ½ portion % of length | 38.4 | 33.33 |
| ½ portion % ΔP if ⅝ | 26.0 | 22.5 |
| ½ portion % tapered | 78.3 | 67.8 |
| ⅜ portion % of length | 30.8 | 33.3 |
| ⅜ portion % ΔP | 66.0 | 68.5 |
| Tapered Multiplier | 2.55 | 2.61 |

| | Type Coil | |
|---|---|---|
| | 3-Circuit Vertical | 4-Circuit Horizontal |
| Mass Flow (lb/min/circuit) | 2.82 | 2.11 |
| ΔP per 100 feet if ⅝ | 1.5 | 0.9 |
| ΔP per coil if ⅝ | 3.90 | 4.05 |
| ΔP tapered | 9.95 psi | 10.57 psi |

All 3- and 4- circuit coils will be either vertical with 80 feet of ⅜ and ⅝, plus 100 feet of ½, or horizontal coils that are one-third ⅝ tube, one-third ½ tube, and one-third ⅜ tube. The horizontal coils will be made in total lengths of 300 feet or 450 feet.

| | Number of Circuits | |
|---|---|---|
| Mass Flow (lb/min/circuit) | 2.82 | 2.11 |
| ⅝ ΔP | 1.5 | 0.9 |

-continued

| Number of Circuits | | |
|---|---|---|
| psi/100 ft | | |
| ΔP vertical (V1) | 9.95 | 5.97 |
| ΔP 300 horizontal (HS1) | 11.75 | 7.05 |
| ΔP 450 horizontal (HL1) | 17.62 | 10.57 |

The 3-circuit, 450 feet per circuit horizontal heat exchanger has excessive pressure drop, all others are acceptable. Coils of more than four circuits cannot contain ⅜ tube and properly return oil in all cases. Because of this and to try to reduce internal volume, the following coil types will be considered for pressure drop calculations.

HL2. 450 foot horizontal coils having 200 feet of ⅜ inch tubing and 250 feet of ½ inch tubing.

HL3. 450 foot horizontal coils having 250 feet of ⅜ inch tubing and 200 feet of ½ inch tubing.

V2. Vertical coils with 80 feet of 5/16 inch and ⅜ inch O.D. tubing and 100 feet of ½ inch tubing.

HS2. 300 foot horizontal coils with 60 feet of 5/16 inch, and 120 feet of ⅜ inch and ½ inch tubing.

The calculation procedures are the same as done with 3 and 4-circuit heat exchangers. The ⅜ inch section will have 4.60 times the pressure drop it would have if it remained ½ inch. The 5/16 inch section will have 1298 times the pressure drop it would have if it remained ½ inch.

| | Heat Exchanger Type | | | |
|---|---|---|---|---|
| | HL2 | HL3 | V2 | HS2 |
| 5/16 Portion % of length | — | — | 30.8 | 20.0 |
| 5/16 Portion % of ΔP if ½ | — | — | 8.0 | 4.2 |
| 5/16 Portion % ΔP tapered | — | — | 103.6 | 54.5 |
| ⅜ Portion % of length | 44.4 | 55.6 | 30.8 | 40.0 |
| ⅜ Portion % ΔP if ½ | 14.5 | 21.3 | 18.0 | 20.8 |
| ⅜ Portion % ΔP tapered | 66.7 | 98.0 | 82.8 | 95.7 |
| ½ Portion % of length | 55.6 | 44.4 | 38.4 | 40.0 |
| ½ Portion % ΔP | 85.5 | 78.7 | 74.0 | 75.0 |
| Tapered Multiplier | 1.522 | 1.767 | 2.606 | 2.252 |
| Number of Circuits | 5 | 6 | 5 | 6 | 5 |
| Heat Exchanger Type | HL2 | HL2 | HL3 | HL3 | V2 |
| Mass Flow (lb/min/circ) | 1.69 | 1.41 | 1.69 | 1.41 | 1.69 |
| ½ ΔP (psi/100 ft) | 1.7 | 1.35 | 1.7 | 1.35 | 1.7 |
| Δp Vertical | — | — | — | — | 11.52 |
| ΔP 300 Horizontal | — | — | — | — | — |
| ΔP 450 Horizontal | 11.65 | 9.25 | 13.52 | 10.73 | — |
| Number of Circuits | 6 | 7 | 8 | 5 | 6 |
| Heat Exchanger Type | V2 | V2 | V2 | HS2 | HS2 |
| Mass Flow (lb/min/circ) | 1.41 | 1.21 | 1.05 | 1.69 | 1.41 |
| ½ ΔP (psi/100 ft) | 1.35 | 1.03 | 0.81 | 1.7 | 1.35 |
| ΔP Vertical | 9.15 | 6.98 | 5.49 | — | — |
| ΔP 300 Horizontal | — | — | — | 11.49 | 9.12 |
| ΔP 450 Horizontal | — | — | — | — | — |

INTERNAL VOLUME CALCULATION

Internal volume of earth coils can be easily calculated from inside diameter of tubes and their length. In a typical 0.375 inch OD; 0.500 inch OD; 0.625 inch OD 300 ft long earth coil the tapered version has only 56.8 per cent of the internal volume of a coil with a 0.625 inch OD 300 feet long. This reduction of internal volume is a significant factor when charging a system.

Since the earth coils are never completely filled with liquid or vapor, the density of the charge in the coil is calculated by the best means available. C.K. Rice summarized the available data in ASHRAE Paper 3035. Mr. Richard A. Farr has curve fit Rices summary in the following equations that will be used:

For evaporators:

$$\rho AVE = \left(\frac{100,000}{G}\right)^{0.285} \times (9.5) + 00.7\, ET$$

For condensers:

$$\rho AVE = \left(\frac{100,000}{G}\right)^{0.155} \times (14.5) + 0.091(CT)$$

Where:
$\rho AVE$ = Average density in lb/ft$^3$
$G$ = Bulk flow in lbs/hour/ft$^2$
$ET$ = Saturated evaporating temperature in °F.
$CT$ = Saturated condensing temperature in °F.

Least charge in winter occurs at the lowest evaporating temperature and on high speed operation (greatest flow rate). The worst case experienced is 25° F. saturated evaporating temperature and 90° F. saturated condensing temperature. These conditions produce a flow rate of 497.7 lb/hr. See Bristol capacity chart. Some superheat will have to be produced in the earth coil, and it is assumed the last five percent of the coil length is used to produce superheat. At earth coil (heating) conditions for evaporator coils average ranges between 9.8–11.4 lb/ft$^3$ for earth coil condensing conditions average ranges between 26.2–27.15 lb/ft$^3$.

Table II gives the dimension and length of the coils that have good oil return properties, acceptable pressure drops, and reasonable refrigerant charges and charge differentials.

TABLE II

| Type of Heat Exchange | Length 5/16 | Length ⅜ | Length ½ | Length ⅝ |
|---|---|---|---|---|
| V1 | — | 80' | 100' | 80' |
| V2 | 80' | 80' | 100' | — |
| HS1 | — | 100' | 100' | 100' |
| HS2 | 60' | 120' | 120' | — |

TABLE II-continued

| Type of Heat Exchange | Length 5/16 | Length ⅜ | Length ½ | Length ⅝ |
|---|---|---|---|---|
| HL1 | — | 150' | 150' | 150' |
| HL2 | — | 200' | 250' | — |
| HL3 | — | 250' | 200' | — |

The summary of vertical coils is shown in Table III.

TABLE III

| Number of heat exch. | Type of heat exch. | Minimum Winter coil charge | Maximum Summer coil charge | Storage Required |
|---|---|---|---|---|
| 3 | V1 | 8.04 | 26.42 | 18.38 |
| 4 | V1 | 11.46 | 35.81 | 24.35 |
| 5 | V2 | 8.16 | 27.62 | 19.46 |
| 6 | V2 | 10.22 | 33.48 | 23.26 |
| 7 | V2 | 12.35 | 39.41 | 27.06 |
| 8 | V2 | 14.68 | 45.39 | 30.81 |

The summary of acceptable heating coils is shown Table IV.

TABLE IV

| | | Horizontal Summary | | |
|---|---|---|---|---|
| No. of Heat Exch. | Type of Heat Exch. | Total Length | Minimum Winter coil charge | Maximum Summer coil charge | Storage Required |
| 3 | HS1 | 900 | 9.30 | 20.45 | 11.15 |
| 4 | HS1 | 1200 | 13.27 | 27.87 | 14.60 |
| 5 | HS2 | 1500 | 9.83 | 22.27 | 12.44 |
| 6 | HS2 | 1800 | 12.32 | 27.09 | 14.77 |
| 4 | HL1 | 1800 | 19.90 | 41.80 | 21.90 |
| 5 | HL2 | 2250 | 20.18 | 42.81 | 22.63 |
| 6 | HL3 | 2700 | 20.17 | 45.57 | 25.40 |

DESIGN CHARACTERISTICS the above calculations and possible coils that can be used apply only to a building that can be heated and cooled by a Bristol Model H23A4635PC two speed compressor or equal. Buildings requiring less heating and more cooling require a new set of calculations. Fortunately this analysis can be accomplished by computer in short order.

This optimization of capacity, oil return, pressure drop and charge calculation is necessary to assure proper operation of the heat pump including efficiency an cost effectiveness.

Low suction pressures in the heating season and high condensing pressures in the cooling season indicate poor installation techniques. Proper grouting of vertical heat exchangers is essential to insure adequate heat transfer. Proper backfilling of horizontal heat exchangers together with proper installation of water saturation lines insures economical performance during cooling operations.

Based on a cost of $0.08 per kwh for electricity, ten of the fourteen residential test buildings cost between $400.00 and $500.00 per year for heating and air conditioning, three cost between $500.00 and $600.00 per year and one with poor installation costs $880.00 per year.

The primary charge differential is stored in receiver 7 but an equal storage volume is available in accumulator 16. The accumulator 16 is equipped with a small, typically 0.040 inch diameter, return orifice. This orifice returns accumulated charge back into the active system in the time it takes for the stored charge to flow through this orifice, typically less than ten minutes.

The length and configuration of the coils is a compromise between length and number of the coils and evaporator temperature during heating. A goal of 30° F. evaporator temperature to reach maximum COP can be compromised to a lower evaporator temperature of say 27° F. at a sacrifice of COP. Economics of first cost and operating cost must be considered in this decision.

A two speed compressor 1 is shown in the preferred embodiment. A variable speed compressor may be used or two compressors using a common or connected crankcase may be used to accomplish the 2:1 ratio in compressor displacement.

While various mechanical arrangements of the apparatus have been disclosed and described herein, it is to be understood that there are various mechanical arrangements that do not depart from the spirit of this invention, and that such mechanisms as fall within the scope of the appended claims are intended to be included herein.

Having thus fully described my invention what I claim as new and desired to be secured by letters patent is:

1. A heat pump system having a sub-surface heat exchanger and using a heat exchanging fluid existing in gaseous and liquid form comprising:
   a compressor for compressing said heat exchanging fluid;
   a four-way reversing valve for directing the flow of said heat exchanging fluid functionally connected to said compressor;
   an indoor heat exchange coil for transferring heat to or from the interior of a building functionally connected to said four-way reversing valve;
   an accumulator for trapping and storing liquids within the apparatus functionally connected to said four-way reversing valve;
   a plurality of sub-surface tapered heat exchanger tubes functionally connected to said four-way reversing valve;
   a bi-directional balanced expansion valve functionally connected to said sub-surface heat exchanger; and
   a receiver for storing excess fluid functionally connected to said expansion valve and to said indoor heat exchange coil.

2. A heat pump system having a compressor, a sub-surface heat exchanger and using a heat exchanging fluid existing in gaseous and liquid form comprising:
   means for transferring heat to and from said heat exchanging fluid while maintaining minimum pressure drop and sufficient fluid velocity for insuring oil entrainment;
   means for distributing, expanding, and storing said heating exchanging fluid;
   means for transferring heat to or from the interior of a building; and
   means for directing the flow of the fluid within the apparatus.

3. A heat pump system as in claim 2 wherein said means for transferring heat to and from the heat exchanging fluid comprises a plurality of tapered heat transfer elements disposed in the ground.

4. A heat pump system as in claim 2 wherein said means for transferring heat to and from the heat exchanging fluid further comprises a plurality of tapered tubes disposed in vertical holes drilled in the earth.

5. A heat pump system as in claim 2 wherein said means for transferring heat to and from the heat exchanging fluid further comprises a plurality of U-shaped tapered tubes disposed in trenches in the earth.

6. A heat pump system as in claim 2 wherein said means for transferring heat to and from the heat exchanging fluid further comprises a plurality of U-shaped tapered tubes disposed in vertical holes drilled in the earth.

7. A heat pump system as in claim 2 wherein said means for storing the heat exchanging fluid comprises a receiver unit.

8. A heat pump system as in claim 2 wherein said means for transferring heat to and from the heat exchanging fluid further comprises a plurality of tapered tubes of appropriate size for maintaining a pressure difference of no more than 10 PSI between the inlet end of the heat exchange tube and the outlet end.

9. A heat pump system as in claim 2 wherein said means for transferring heat to and from the heat exchanging fluid further comprises a plurality of tapered tubes of appropriate size for maintaining sufficient velocity of the heat exchanging fluid for assuring oil entrainment disposed in the ground.

10. A heat pump system as in claim 2 wherein said means for transferring heat to and from the heat exchanging fluid further comprises a plurality of tapered tubes of appropriate size for minimizing a charge of heat exchanging fluid disposed in the ground.

11. A heat pump system as in claim 2 wherein said means for distributing the heat exchanging fluid comprises a distributor manifold functionally connected to said means for transferring heat to and from said heat exchanging fluid.

12. A heat pump system as in claim 2 wherein said means for transferring heat to and from the heat exchanging fluid further comprises a plurality of U-shaped tapered tubes disposed in vertical holes drilled in the earth with grouting disposed around the heat transfer elements for increasing the rate of heat transfer to and from the native earth.

13. A heat pump system as in claim 2 wherein said means for compressing the heat exchanging fluid further comprises a variable displacement compressor operating at greater displacement when heat is being extracted from the earth and lower displacement when heat is being rejected to the earth.

14. A heat pump system as in claim 2 wherein said means for transferring heat to and from the heat exchanging fluid further comprises a plurality of U-shaped tapered tubes disposed in trenches in the earth with sand around the tubes and a moisture impermeable membrane between the sand and the native earth and a means of adding water to the sand to increase the rate of heat transfer between the coil or the sand and the native earth.

15. A heat pump system as in claim 2 wherein said means for transferring heat to and from the heat exchanging fluid comprises a plurality of heat transfer elements disposed in a pond of water.

16. A heat pump system as in claim 2 wherein said means for transferring heat to and from the heat exchanging fluid further comprises a plurality of tapered tubes disposed in a pond of water.

17. A heat pump system as in claim 2 wherein said means for transferring heat to and from the heat exchanging fluid further comprises a plurality of tapered tubes of appropriate size for minimizing a charge of heat exchanging fluid disposed in a pond of water.

18. A heat pump system as in claim 2 wherein said means for transferring heat to and from the heat exchanging fluid further comprises a plurality of U-shaped tapered tubes disposed in a pond of water.

19. A heat pump system as in claim 2 wherein said means for directing the flow of the heat exchanging fluid comprises a four-way reversing valve.

20. A heat pump system as in claim 2 wherein said means for transferring heat to or from the interior of a building comprises a receiver tank and a heat exchanger coil.

21. A heat pump system as in claim 1 wherein said sub-surface tapered heat exchange tubes further comprise a plurality of individual tubes, each comprising a plurality of fixed diameter tubes, joined one to another, with diameter increasing from a first end to a second end.

* * * * *